April 29, 1924.
T. MORSKI
1,492,140
SPRING SUSPENSION FOR VEHICLES
Filed May 19, 1919    2 Sheets-Sheet 1
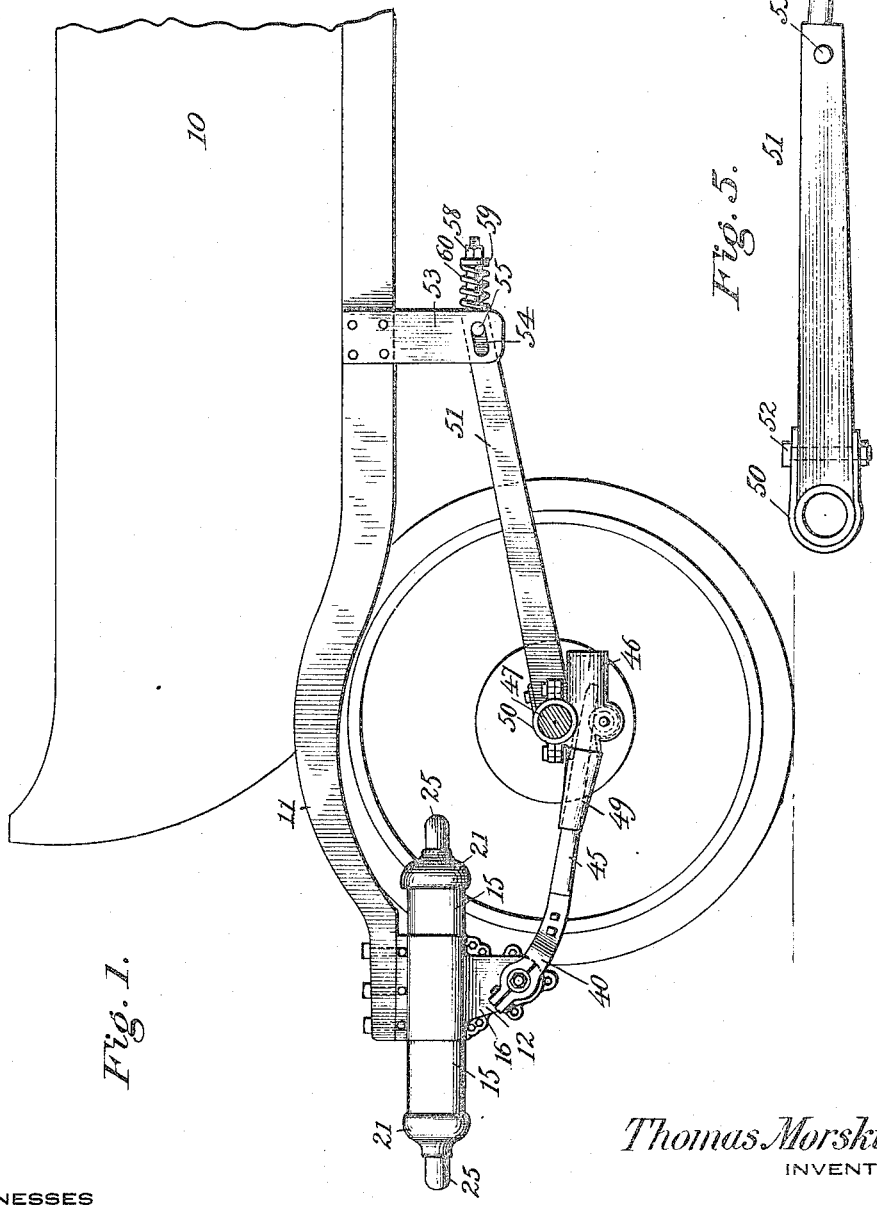
Thomas Morski
INVENTOR
WITNESSES April 29, 1924.  
T. MORSKI  
1,492,140  
SPRING SUSPENSION FOR VEHICLES  
Filed May 19, 1919  
2 Sheets-Sheet 2
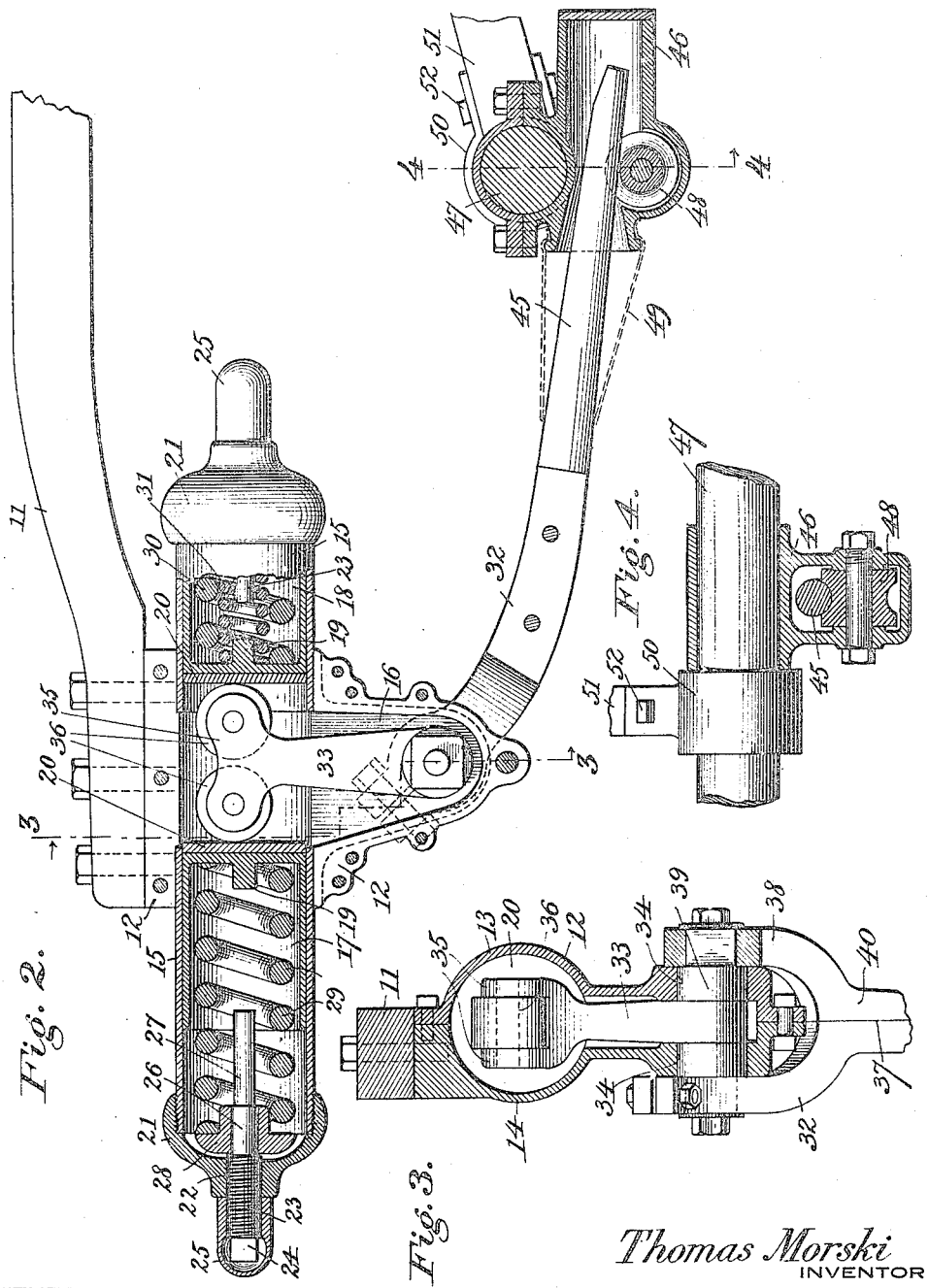
Thomas Morski  
INVENTOR Patented Apr. 29, 1924.

1,492,140

UNITED STATES PATENT OFFICE.

THOMAS MORSKI, OF MANISTEE, MICHIGAN.

SPRING SUSPENSION FOR VEHICLES.

Application filed May 19, 1919. Serial No. 298,226.

*To all whom it may concern:*

Be it known that I, THOMAS MORSKI, a citizen of Russia, residing at Manistee, in the county of Manistee and State of Michigan, have invented new and useful Spring Suspensions for Vehicles, of which the following is a specification.

This invention relates to spring suspension for motor vehicles.

The principal object of this invention is to provide a spring suspension for vehicles to be used in conjunction with, or independently of the usual elliptic springs, which will not only absorb all the shocks imparted to the wheels, but will positively react against the violent rebound which usually follows each shock so that the vehicle will ride as comfortably over rough roads as over smooth ones.

Other general objects are to furnish a spring suspension which will be adjustable to the load, which may be adapted readily both for front and rear suspension on nearly all types of motor vehicles, and which will be rugged and strong yet compact and simple in construction.

A specific object in mind is to provide an axle attachment which will take the place of the radius rods provided on some cars, and which is to be used in connection with a shock absorber of the type described and claimed in the co-pending application, serial number 272,057, filed by myself jointly with O. J. Brugman on January 20, 1919. The axle attachment is designed to transmit all major shocks received by the axle from whatever direction to the shock absorber proper, thus preventing the car body from receiving any shocks not cushioned by the absorber.

The invention will be fully understood by referring to the accompanying drawings illustrating one embodiment thereof, in which—

Figure 1 is an elevation showing the invention in place on the rear axle of an automobile;

Figure 2 is a longitudinal sectional view showing the construction of the shock absorber proper and attendant parts;

Figure 3 is a transverse sectional view taken on the line 3—3 of Figure 2 and looking in the direction of the arrow;

Figure 4 is a like view taken on the line 4—4 of Figure 2, looking in the indicated direction; and Figure 5 is a plan view of the rod which holds the axle in place on cars not provided with radius rods.

Referring in more detail to the drawings, it is seen that the numeral 10 indicates the body of a car and 11 an extension of the side frame thereof, both parts being illustrated conventionally. Secured by bolts or in other ways to the rear end of said frame is a split casing 12 including the complemental parts 13 and 14. Obviously the casing may be mounted on the forward end of the car frame. This split casing is so formed as to present two distinct chambers, a cylindrical compartment 15 which serves as a housing for springs, and a portion 16 which lies approximately at right angles to and extends below the cylinder 15. This portion 16 is designed to house a swinging lever which transmits the axle movements to the springs in the cylinder. The rear part of the cylinder is considerably longer than the part forward of the portion 16, as the drawing shows.

Within the cylinder and on either side of the depending housing 16, two pistons 17, 18, are provided to slide freely. These pistons are exactly alike in being hollowed out or cup-shaped to reduce their weight and in the provision of a preferably integral stub spindle or stem 19 extending axially for a purpose to be described. Each piston also has on its inner face a hardened steel disk 20 secured in any desirable manner. Piston 17, however, reciprocates in the long portion of the cylinder while piston 18 moves in the short portion; hence it is desirable to have the latter of less length than piston 17.

Closing the ends of the cylinder are caps 21. These caps have central threaded bores 22 to receive threaded spindles 23, and are screwed upon the cylinders or otherwise detachably secured. The outer ends 24 of the spindles 23 are squared so as to be readily turned by a socket wrench. Cup nuts 25 are screwed on the spindles to hold them relatively to the caps 21 and to enclose and protect the squared ends 24.

The inner half of each spindle 23 is stepped or reduced to provide a bearing portion 26 and an extension 27. A head 28 is mounted upon the bearing 26 so as to turn freely thereon. A strong, heavy spiral spring 29, 30, is fitted in the long and short sections respectively of the cylinder between the pistons 17, 18, and the heads 28. It will be clear that the tensions of springs 29, 30, are regulated by turning the spindles 23 by means of the squared ends 24. The further in the spindles are turned, the more heads 28 compress the springs.

Figure 2 illustrates an auxiliary coil spring 31, housed in the short section of the cylinder and held in place by the spindles 23 and 19. These spindles prevent the auxiliary spring from buckling when strongly compressed, which might cause the auxiliary spring to be caught in the coils of the surrounding and much larger spring 30. While only one auxiliary spring is shown, I may use another at the other end of the cylinder, as is described, illustrated and claimed in the co-pending application referred to. This second auxiliary spring would be similar to spring 31 except that it would be longer. The purposes of these auxiliary springs will be explained in full below.

A bell crank lever composed of the separable arms 32 and 33 is pivoted in the lower part of the chamber 16 in bearings 34. The lever 33 is the shorter of the two arms and is flared and bifurcated at the upper end, as indicated at 35. Anti-friction rollers 36 are mounted at this end and normally press against the hardened steel disks 20 of the pistons 17, 18. Thus the arm 33 cannot swing without moving one of the pistons and compressing one of the heavy springs 29, 30. In any such swinging the rollers 36 will move over their respective disks.

The arm 32 is curved somewhat and disposed at an angle greater than 90 degrees with respect to arm 33. It is bifurcated, as the numeral 37 indicates, to form the forked end 38 which fits over the casing 12. A pivot shaft 39 is connected to the arms 32 and 33 in any suitable way. One of the furcations 40 of the arm 32 is preferably removable from the arm as a whole to allow easy assembling of the device.

Those parts which have been so far described might be said to make up the shock absorber proper. The parts now to be taken up are the axle connection and suspension, which constitute an important feature of the present invention.

As Figure 2 shows, the outer end of arm 32 is a solid shank 45 with a decided taper. This shank is enclosed for about half its length by a box 46 clamped to the axle 47. A grooved wheel 48 forms a roller bearing for the reduced end of the shank, which is allowed to move longitudinally, sidewise and vertically to a limited extent within its box. Thus a form of a universal joint is established between the axles 47 and the bell crank lever which will not transmit unimportant vibrations of the axle but will communicate all up-and-down movements that are of moment. A conical resilient dust cap 49 protects the inside of the box 46 from dirt.

The parts now to be described are designed to hold the axle in place on cars which have no radius rods. A strap 50 and bolt 52, or similar means, pivotally secure a bar 51 to the axle 47 so that it extends normally upwardly and forwardly to a connection with a shackle 53 of the side frame extension 11. The shackle is preferably rigidly mounted on the side frame 11, on the other side of the vehicle wheel from the shock absorber. This shackle has near its lower end a transverse slot 54 which receives a pin or stud 55 formed on the bar 51. The slot is in alinement with the bar 51 when in normal position so that the pin may move back and forth in the slot. The extreme end 56 of the bar is reduced and rounded and bent at an angle. The bar extends through the shackle with its pin lying in the slot and the reduced end 56 lying approximately horizontal at all times. Screw threads 57 are provided on part 56 to receive a nut 58 and washer 59, which in turn hold a coil spring 60 in place on the end 56. The tension of spring 60 is thus capable of being varied. The connection between bar 51 and the shackle is such that the bar may rock about pin 55 as an axis, or may move longitudinally to a limited extent, with such movements cushioned by spring 60, or the bar may rock and move longitudinally both at the same time.

It should be clear from the foregoing that the present invention provides a suspension which does away with all communication of axle vibrations to the car body. Most shock absorbers work well enough when heavy ruts or bumps are encountered on the road, but fail to provide for the absorption of all minor vibrations as well.

Referring again to the shock absorber per se as shown in Figure 2, it is seen that the lefthand piston 17 normally lies approximately flush with the wall of the chamber 16, while the righthand piston 18 is pressed back into that end of the cylinder. The reason for this is that the spring 29 on the left side is normally put under considerably greater tension than spring 30 because it is the spring which absorbs the first shock from the axle, while spring 30 only absorbs the rebound.

The function of the auxiliary spring 31 is to cause the piston 18 to follow closely on the roller 36 when a shock causes the arm 33 to swing rapidly to the opposite side. The spring 30 would not cause the piston 18 to follow the roller and when the arm 33 returned, there would be a knock. Spring 31 keeps its piston pressed tight against the roller, whatever the position of the latter, and renders the operation of the device noiseless.

If an auxiliary spring is used on the left side of the cylinder, it is preferably placed there under a different degree of tension from that of its enclosing spring 29. This will make the shock absorber take vibrations better, thus enhancing the riding qualities of the attachment. The vibrations in one spring will be offset, at least partially, by the other. It is also possible to use the outer spring 29 of lighter wire if two concentric springs are used.

This invention has numerous advantages. It is easily attached and adjusted. It checks the violent rebound which leaf springs give rise to. Whereas leaf springs must be lubricated several times a season, the shock absorber above described being enclosed in a dust and waterproof casing, needs no attention when once installed. A considerable quantity of oil may be placed in the cylinder, sufficient to last for years. This oil not only eliminates wear, but smothers any noise and acts as a supplementary cushion. Small holes are provided in the pistons which allow the oil to move back and forth slowly in the manner familiar in dash pots, bringing about the cushioning effect which is so desirable.

While the spring suspension has been shown attached to the rear of a vehicle, it can be adapted to the front without mechanical difficulties. It is obvious that many changes may be made in the details of construction as described without departing from the invention.

What is claimed is:—

1. The combination with a vehicle having a frame, of a shock absorber interposed between an axle and said frame, a shackle secured to said frame, a slot in the shackle, and a bar connected with said axle and shackle, said bar having a pin movable in said slot, said shock absorber normally bearing the entire load put upon that part of the axle near which it is mounted by the vehicle body.

2. The combination with a vehicle having a frame, of a shock absorber interposed between an axle and said frame, means pivotally attached to said axle but bearing no part of the load put on said axle, a shackle attached to said frame, said shackle having a slot near its lower end, said means engaging with the shackle in its slot, and a spring holding the shackle and said means resiliently together.

3. The combination with a vehicle having a frame, of a shock absorber interposed between an anxle and said frame, a shackle attached to said frame, a bar attached to said axle and having a pin, the shackle having a slot in alinement with said bar to receive said pin, and a coil spring surrounding the free end of said bar to hold the pin resiliently in its slot.

4. The combination with a vehicle having a frame, of a shock absorber interposed between an axle and said frame, a shackle attached to said frame, a bar attached to said axle, said bar carrying a pin and having a reduced free end, said shackle being provided with a slot for said pin, and a coil spring surrounding the reduced end of the bar, said coil spring being regulatable to vary the tension with which the pin is held in its slot.

5. The combination with a vehicle having a frame, of a shock absorber mounted on said frame, said shock absorber including a lever, and a box mounted on an axle and receiving the free end of said lever in such a way as to allow limited motion of that end in all directions.

6. The combination with a vehicle having a frame, of a shock absorber mounted on said frame, said absorber including a lever, and a box secured to an axle and receiving the free end of said lever, said box carrying a roller, said roller normally supporting said free end.

7. The combination with a vehicle having a frame, of a shock absorber mounted on said frame, said shock absorber including a lever whose free end is tapered, a box secured to an axle and housing the tapered end of the lever, said box being provided with a roller, said roller normally supporting the lever but permitting movements thereof in all directions for a limited distance.

8. The combination with a vehicle having a frame, of a shock absorber secured to said frame, a box mounted on an axle, a lever extending from the shock absorber to a point within the box but unattached thereto, and a bar pivoted upon said axle and secured resiliently to said frame.

9. The combination with a vehicle, of a shock absorber, a box mounted on an axle and a lever extending from the shock absorber to the box with its free end housed by the latter, the connection between box and lever being such that small vibratory movements of the axle in any direction do not affect the lever.

10. The combination with a vehicle having a frame, of a shock absorber secured to said frame, a box mounted on an axle, a lever extending from the shock absorber to a point within the box, and a bar secured to said axle and said frame, the connections between box and lever and bar and frame being such that vibrations of the axle are not transmitted to the shock absorber and frame respectively.

11. In a shock absorber, a casing including a cylindrical portion and a depending portion, a lever pivoted in the depending portion, anti-friction rollers mounted on the upper end of said lever, pistons reciprocable in the cylinder on each side of the lever and contacting with the rollers, and a spring reacting upon each piston, one of said springs being under greater tension than the other.

12. The combination with a sectional casing comprising a cylindrical compartment for springs, and a housing depending from the compartment intermediate of the ends of the latter, of a bell crank lever composed of separable arms pivoted to the housing, one of said arms being arranged within the housing, rollers mounted on the end of said arm, pistons within the compartment having closed ends against which said rollers are caused to bear, springs within said compartment and within said pistons, the other arm of said lever being arranged outside of said housing and means for flexibly connecting said arm to an axle.

13. A spring suspension for vehicles having a frame or chassis and an axle, comprising a casing mounted on the frame, a lever pivoted to the casing and extending toward the axle, means in the casing for resisting movement of one end of the lever, means loosely connecting the other end of the lever with the axle, and means rigidly connected to the axle and resiliently connected to the frame and functioning as a radius rod.

14. A spring suspension for vehicles having a frame and an axle, comprising a casing mounted on the frame, a lever pivoted to the casing and extending toward the axle, coil springs in the casing mounted on each side of one end of the lever for resisting movement thereof in each direction, a box carried by the axle and loosely receiving the other end of the lever so that small movements of the axle in all directions may take place without moving the lever end which is within the casing, and a bar pivotally connected to the axle and resiliently connected to the frame and extending in a direction opposite to that in which the lever extends.

15. The combination with a vehicle having a frame, of a shock absorber interposed between an axle and said frame, a shackle attached to said frame, a bar attached to said axle, said bar carrying a pin and having a reduced free end, said shackle being provided with a slot for the pin, a coil spring surrounding the reduced end of the bar, said coil spring being regulatable to vary the tension with which the pin is held in its slot, a lever joining the axle with the shock absorber, and a box mounted on the axle and providing a housing for the free end of said lever, said box and lever being unattached to each other.

16. The combination with a vehicle having a frame, of a shock absorber mounted on said frame, a lever having one end thereof tapered and the other end thereof restrained in its movement within the shock absorber, a box secured to the axle and housing the tapered end of the lever, said box being provided with a roller, said roller normally supporting the lever but permitting movements thereof in all directions for a limited distance, a bar connected to the axle, a shackle secured to said frame, said shackle having a slot, and said bar having a pin movable in said slot.

17. The combination with a vehicle having a frame, of a shock absorber interposed between an axle and said frame, a shackle attached to said frame, a bar attached to said axle, said bar carrying a pin, a slot in said shackle for said pin, a spring mounted on the bar and restraining movement of the pin in its slot, a lever connecting the shock absorber to the axle, a box secured to the axle and housing end of the lever, said box being provided with a roller, said roller normally supporting the lever but permitting movements thereof in all directions for a limited distance.

18. A shock absorber for vehicles including a cylindrical body, a lever support joined to the cylindrical body and depending therefrom at a point nearer one end than the other, a lever pivoted upon the support, a pair of pistons reciprocable in the cylinder on opposite sides of one end of the lever, springs normally urging the pistons toward each other, and means for regulating the tension of the springs, the spring in the longer portion of the cylinder being the longer and under greater tension than the opposite spring, whereby the piston which it presses is normally disposed closer to the depending lever support than the other piston.

In testimony that I claim the foregoing as my own, I have hereto affixed my signature in the presence of two witnesses.

THOMAS MORSKI.

Witnesses:
JOHN AUSTIN,
E. G. KIEVIT.